United States Patent [19]
Braithwaite et al.

[11] 3,980,536
[45] Sept. 14, 1976

[54] PROCESS FOR PRODUCING MAGNESIUM METAL FROM MAGNESIUM CHLORIDE BRINES

[75] Inventors: David G. Braithwaite, Brookhaven, Miss.; William P. Hettinger, Jr., Iselin, N.J.

[73] Assignee: NL Industries, Inc., New York, N.Y.

[22] Filed: Apr. 11, 1975

[21] Appl. No.: 567,365

[52] U.S. Cl. .................................. 204/70; 423/178; 423/497; 423/498
[51] Int. Cl.$^2$ ...................... C25C 3/04; C01F 5/30; C01F 5/34
[58] Field of Search ............. 204/70; 423/178, 497, 423/498

[56] References Cited
UNITED STATES PATENTS

| | | | |
|---|---|---|---|
| 1,902,385 | 3/1933 | Tanaka et al. ...................... | 423/178 |
| 2,369,610 | 2/1945 | Schamboa et al. .................. | 204/70 |
| 2,402,959 | 7/1946 | Gustafson et al. .................. | 423/178 |
| 2,417,772 | 3/1947 | Marck ................................ | 423/498 |
| 3,338,668 | 8/1967 | Lyons et al. ........................ | 423/498 |
| 3,516,785 | 6/1970 | Smith ............................. | 423/498 X |
| 3,810,970 | 5/1974 | McCormick ...................... | 423/498 |

*Primary Examiner*—F.C. Edmundson

[57] ABSTRACT

Magnesium metal is produced by electrolysis of a molten magnesium chloride electrolyte containing fluoride ions, the electrolyte being derived from holding pond brines which are partially deboronated, concentrated, gelled and spray dried in the presence of hydrochloric acid gas to form discrete particles of high density anhydrous magnesium chloride feed material for electrolytic cells.

20 Claims, No Drawings

PROCESS FOR PRODUCING MAGNESIUM METAL FROM MAGNESIUM CHLORIDE BRINES

BACKGROUND OF INVENTION

The production of magnesium metal by electrolysis of magnesium chloride concentrate, as presently practiced commercially, is generally carried out as a batch-type operation in a series of electrolytic cells in each of which the electrolyte comprises a substantially anhydrous magnesium chloride concentrate derived from the naturally occurring brines of salt lakes, inland seas, oceans and the like. However, before these naturally occurring brines can be used as an electrolyte for the electrolytic recovery of magnesium metal they are subjected to solar evaporation in successive ponds to precipitate a major portion of the NaCl and a complex salt of KCl and $MgSO_4$ known as kainite as described in U.S. Pat. No. 3516785. The residual brine, hereinafter referred to as a holding pond brine is then desulfated by treatment with calcium chloride and the desulfated brine concentrated to effect removal of residual metal salts and water. In this connection it is well understood that a magnesium chloride electrolyte derived from brine must be substantially free of water of crystallization for otherwise $H_2$ will be formed at the cathode; and $O_2$ and compounds of oxygen will be evolved at the anode thus causing rapid deterioration of the anodes. Moreover, any MgOHCl and MgO must be removed otherwise particulate MgO will form and sink to the bottom of the cell to form cell smut which reduces cell efficiencies and requires much labor and expense, in terms of cell down time, to remove it from the cell.

While it is possible to remove up to four moles of water from the magnesium chloride brine by slow drying the brine at temperatures of about 400°F further drying at elevated temperatures has been found to effect hydrolysis of the brine with the result that a mixture of magnesium chloride and magnesium hydroxychloride is produced. The present practice of forming a substantially dry magnesium chloride feed material for electrolytic cells is by using a spray-drier unit. Units of this type are traversed by heated gases having air inlet temperature of about 1000°F and an outlet or discharge temperature of about 500°F. A magnesium chloride brine concentrate fed into the inlet of the spray drier is recovered from the outlet as a substantially dry product containing no more than from 3 to 5% water—which, after further dehydration in a melt cell, is sufficiently free of water to be used effectively as feed material in electrolytic cells for the product of magnesium metal. However while substantially free of water the spray dried magnesium chloride prepared as described above will be in the form of thin walled microspheres about 800 microns in size and easily friable into fragments which, because of their low bulk density are easily air borne and hence create difficult problems of handling, transportation, storage and the like. Also, it is well known that spray dried magnesium chloride prepared from brine concentrate will contain boron or a boron compound which if present in the magnesium chloride electrolyte in proportions equivalent to as little as from 150 to 200 ppm boron will inhibit coalescence of the magnesium metal in the cell with the result that cell current efficiencies are lowered and significant amounts of magnesium metal end up in the cell smut.

It is important therefore to production of magnesium metal on plant scale that the magnesium chloride electrolyte be not only substantially free of MgO and/or MgOHCl but also boron; or that the level of boron in the electrolyte be reduced sufficiently that its adverse affects on the coalescence of the magnesium metal and cell efficiencies be minimized.

Known methods for producing magnesium chloride electrolytes having low levels of boron and other contaminants including MgO and/or MgOHCl include chlorination of the spray dried magnesium chloride i.e. treating the $MgCl_2$ with gaseous chlorine in a reducing atmosphere, either during melting of the spray dried material or subsequent thereto. However, while chlorination of the MgO and/or MgOHCl is readily effected the removal of boron by chlorination is a slow and expensive process requiring long contact times in the melt cells and/or chlorinators, and the handling of large volumes of gaseous chlorine. As a result chlorine cost become prohibitively high, melt cell life is seriously shortened and catastrophic feeding and corrosion problems develop. And further, because of the fluffy, friable nature of the spray dried magnesium chloride it is extremely difficult to feed it to the melt cell and/or chlorinators at controlled rates; and is frequent cause for plugging and other operational difficulties.

To recapitulate, using present methods of forming a magnesium chloride electrolyte from naturally occurring brines for the electrolytic production of magnesium metal the presence of boron in the electrolyte and the light weight and easily friable nature of the spray dried magnesium chloride concentrate are the source of many difficult handling problems, require elaborate and expensive equipment installations, and give rise to high operational and maintenance costs, low cell efficiencies and low recoveries of magnesium.

It is desirable therefore to provide an improved method for treating naturally occurring brines so as to form a substantially anhydrous high density, boron-free magnesium chloride feed material for the electrolytic production magnesium metal in a simple, relatively economical and efficient manner.

SUMMARY OF INVENTION

The present invention, then, is the discovery of certain improvements in the process steps currently in use for producing magnesium metal from salt lake brines, the improvements of this invention being directed particularly to a simplification of known processes for forming anhydrous magnesium chloride feed material for the electrolytic cells whereby equipment costs as well as maintenance and operating costs associated therewith are reduced substantially. More particularly, whereas melt cells and/or chlorinators had been required heretofore to reduce, by chlorination, the amount of magnesium oxide, MgOHCl and water in the spray dried magnesium chloride prior to feeding the magnesium chloride to the electrolytic cells it has now been discovered that use of this equipment together with the costs attending the operation and maintenance thereof maybe entirely eliminated by treating holding pond brines with an extractant to remove at least a portion of the boron therefrom prior to concentrating the brine; followed by gelling the concentrated brine prior to spray drying and spray drying the gelled magnesium chloride brine in an atmosphere of hydrochloric acid gas as a consequence of which a magnesium chloride feed material in form of dense microspheres is formed which is substantially free of magnesium oxide, MgOHCl and water, and that by adding this MgCl₂ feed material to an electrolytic cell as an electrolyte in the presence of fluoride ions any residual magnesium oxide, MgOHCl, water and boron in the electrolyte is dissipated sufficiently to insure high current efficiencies and eliminate loss of magnesium due to coalescence and similar problems attributal to the presence of boron, magnesium oxide and/or MgOHCl and water in an electrolyte.

To these advantages may be added the improved physical properties of the spray dried magnesium chloride which, as a spray dried magnesium chloride gel comprises discrete particles of anhydrous magnesium chloride of relatively high bulk density. As a consequence, the product can be readily transported to storage and from storage to the melt cells without incurring losses due to dusting, plugging of feed lines and the like.

PREFERRED EMBODIMENT OF INVENTION

While the invention is applicable to the treatment of brines derived from oceans, inland lakes, salt wells and the like the brine used for purposes of illustrating the present invention is derived from Great Salt Lake, Utah, and is first subjected to solar evaporation in successive stages whereby a major portion of the sodium chloride and the complex salt kainite are precipitated from the original brine. The mother liquor, hereinafter referred to as a holding pond brine, will have the following typical analysis:

Sp.G. 1.32, 7.0 to 7.5% Mg as $MgCl_2$, 0.42 to 0.61% Na, 0.54 to 0.83% K, 0.05 to 0.06% Li, 0.005 to 0.007% Ca, 3.58 to 4.18% $SO_4$ and from 400 to 550 ppm B.

Pursuant to the objects of this invention the brine is then treated in a manner to remove a substantial portion of the boron prior to concentration and spray drying. While there are several methods by which boron may be removed efficiently and economically at this stage in the process, a preferred method but by no means limiting of the invention, is one using solid-liquid extraction wherein the solid extractant is activated alumina.

The term activated alumina will be understood to mean a form of alumina having a multiplicity of active sites as for example freshly prepared anhydrous alumina, or commercial grades of alumina known to the trade as Nalform manufactured by Nalco Chemical Co. and Kaiser alumina manufactured by Kaiser Aluminum Co. Another form of activated alumina which is equally effective as an extractant is a compound of $Al_2O_3 \cdot MgO$. Extraction of the boron from the brine is effected by adding the activated alumina in amounts in the range of from 0.5 to 20.0 percent on brine weight basis to the brine, mixing the constituents thoroughly while heating to elevated temperatures, preferably about 80°C, for from 30 to 60 minutes after which the solid extractant is separated from the brine by filtration, centrifuging or simply by settling. Using this relatively simple procedure a substantial portion i.e. 40 to 60 percent of boron in the original brine can be removed.

However, as pointed out above the invention contemplates other methods of boron removal as for example it has been found that by using a solid-liquid extraction process wherein the solid extractant is a finely divided lignite, boron removals of as high as 70 percent can be achieved. Thus to a brine of the above analysis is added a finely divided lignite in an amount in the range from 1 to 30 percent on a brine weight basis at ambient temperature and for a predetermined length of time after which the solid extractant is separated from the brine in any suitable manner leaving a supernatant brine from which an appreciable portion of the boron has been removed by adsorption in the extractant. The lignite may be a naturally weathered lignite or a commercial grade known as Geopon Lg-20 manufactured and sold by N L Industries, Inc. having a screen size in the range from −40 to +325 mesh. Other lignites may be used as in particular neutralized lignites i.e. naturally occurring lignite treated with alkali or alkaline earth metal such as sodium, potassium, calcium or magnesium to a pH of from 4 to 6.

Further, it is also been found that boron values in naturally occurring brines may be removed efficiently and at minimum expense using again a solid-liquid extractant wherein the solid extractant is a calcined oolytic sand the steps of this process comprising essentially: intimately mixing a holding pond brine of the above anaylsis with calcined oolitic sand having particle size in range from −20 to +325 standard screen size in amount in the range from 5 to 25 percent on brine weight basis and at ambient temperature or temperatue as high as 100°C for from 35 to 60 minutes and preferably about 40 minutes after which the mixture is allowed to cool whereupon the solid extractant settles leaving a supernatant liquor from which an appreciable portion of the boron has been removed.

Still another process for removing boron from pond brines prior to concentrating the brine comprehends the use of solid liquid extraction wherein hydrogen fluoride is added to the brine. The procedure is as follows: A holding pond brine of the above analysis is fed into a reaction tank to which is added a 48–50 percent solution of hydrogen fluoride at a loading of from 0.7 to 1.5 percent on a brine weight basis and with continuous agitation for from 0.75 to 2 hours to form an insoluble complex salt of potassium, fluorine and boron. The temperature of the mixture should be maintained between 0° and 50°C for acceptable removal of the boron as a potassium tetrafluoborate, optimum removals occurring at temperatures from ambient to 25°C. Following the first stage the fluoride treated brine is fed into a settling tank in which the pH of the brine is adjusted, if necessary, by the addition of HCl to a pH < 1 after which the brine is allowed to remain quiescent for from 1 to 7 days. During this period the insoluble potassium tetrafluoborate settles out of the residual brine. The latter is then fed into a treatment tank in which the pH of the brine is adjusted to from 4 to 6 by addition of a suitable neutralizing agent as for example MgO which produces a clear magnesium chloride solution sufficiently neutral to be subsequently concentrated without deleterious affects on plant equipment.

Following removal of the boron by any one of the preceding methods the brine is then concentrated to a level of at least 30 to 45% $MgCl_2$ with no more than about 2 moles chemically combined water. As pointed out above it has been the practice heretofore to then subject the brine concentrate to spray drying to further reduce the water content at least to as low as about 3 to 5 percent on a brine weight basis. However, pursuant to the objects of this invention the partially deboronated concentrate is first mixed with a gelling agent, prior to spray drying, such that, following spray drying, the spray dried product will have a relatively high bulk density the phrase "of high bulk density" being definitive of dried magnesium chloride having a bulk density of at least 20 pounds per cubic foot.

More particularly, the gelling agent used in preparing the partially deboronated, high bulk density magnesium chloride of this invention may be magnesium hydroxide, ammonium hydroxide, sodium hydroxide, and magnesium carbonate; and while $Mg(OH)_2$ prepared externally by hydration of calcined MgO is effective it is preferred to form the $Mg(OH)_2$ in situ, as for example by adding calcined MgO, to an aliquot of brine.

Thus the preferred procedure for gelling a magnesium chloride brine for use as spray drier feed is to form a gellant by homogenizing an aliquot of the brine with an aqueous slurry of magnesium oxide both at elevated temperature, and adding the resulting slurry to the remaining brine at elevated temperature and with agitation followed by cooling whereupon the entire brine is gelled, the time required to form the brine gel being dependent on the ratio of gellant to the aliquot of brine, temperatures, and similar factors. In this connection it has been found that temperature is a significant factor in the formation of a gel; that the temperature of the gellant slurry should be preferably below 100°F and that the temperature of the brine to which the gellant is added should not be above about 200°F.

As an alternative to the preferred procedure a gellant may be made by homogenizing a mixture of magnesium oxide and warm tap water i.e. about 72°F and then adding the resulting slurry to the magnesium chloride brine at 200°F followed by continuous agitation and cooling. Upon cooling with continued agitation the brine will gel. Using this procedure brine gels have been formed in 45 minutes. If cold tap water is used and the aliquot of brine is at room temperature the gel will be formed even more rapidly i.e. in about 60 minutes.

The invention also comprehends a further modification wherein the gellant is prepared by homogenizing the magnesium oxide with an aliquot of brine at elevated temperature and the resulting slurry dispersed in the remaining brine also at elevated temperature with continued agitation. Using this procedure gels have been formed in 30 minutes.

In addition to gels formed with a metal oxide i.e. magnesium oxide, brine gels have been formed using a hydrous $MgCO_3$ gellant wherein an aqueous slurry of $NaCO_3$ at about 72°F is added to an aliquot of brine and the mixture diluted with lukewarm water to precipitate a hydrous $MgCO_3$ filter cake. This gellant is then added to the remaining brine at elevated temperature followed by cooling to yield a gel in about 15 minutes. The gels formed by the process of this invention will, in most instances, have the consistency of a heavy cream but are essentially thixotropic such that when subjected to agitation, pressure or the like, as encountered in spray drier equipment, will become substantially fluid-like and hence be readily amenable to spray drying.

A metal oxide found to be most effective in forming a magnesium hydroxide gellant according to the method of this invention is MgO in the form of calcined magnesite. However, other forms of magnesium oxide varying in physical characteristics from calcined magnesite are contemplated within the scope of the present invention. Moreover, other gelling agents found to be effective include ammonium hydroxide and sodium hydroxide. Further details of the process for producing $MgCl_2$ brine gels are described in copending application Ser. No. 560,337 filed Mar. 21, 1975 said application and the instant application having a common assignee.

With reference again to the U.S. Pat. No. 3,516,785 it is customary to dry a magnesium chloride concentrate using spray drier equipment wherein the concentrated brine is sprayed into a zone of hot gases by means of tangentially slotted rotary spray nozzles. The hot gases used in conventional spray dry equipment are generally hot waste gases at about 950°F such as exhaust gases recovered from gas turbines used to drive alternating current generators for supplying electrical energy to the overall process. These hot gases inevitably contained water as a consequence of which a portion of the magnesium chloride in the spray drier is decomposed into solid particles of magnesium oxide. Hence, it has been necessary to chlorinate the spray dried material so as to reduce and/or remove the magnesium oxide before feeding the magnesium chloride to the electrolytic cells; chlorination usually being done in a melt cell wherein the dry magnesium chloride powder is melted and simultaneously chlorinated. In this connection it was early discovered that chlorination efficiencies were generally low but could be greatly improved by maintaining a prescribed level of ferric or ferric chloride in the melt in combination with carbon. Hence, it has been customary to add both an iron salt such as ferrous or ferric chloride and carbon to the melt cell and while chlorination efficiencies are improved the chlorinated molten magnesium chloride retained some iron which had to be removed before feeding the molten magnesium chloride to the electrolytic cells.

In keeping with the objects of the present invention it has now been found that by contacting the magnesium chloride gel with hot technical grade (99%) hydrochloric acid gas, as for example in spray drying equipment or by fluid bed technology at temperature of about 400°C, any magnesium oxide formed by the water present in the magnesium chloride gel is effectively chlorinated as a consequence of which the level of magnesium oxide and water in the dried magnesium chloride is greatly reduced thereby eliminating the need for melt cell chlorination.

Further, it has been found that by maintaining fluoride ions in the electrolytic cell melt as for example by adding an alkaline earth metal fluoride to the electrolytic cell melt any residual magnesium oxide, water or boron in the magnesium chloride feed material is effectively dissipated.

In carrying out the process of this invention holding pond brine having a specific gravity of about 1.32 and comprising essentially from 7 to 7.5% Mg as $MgCl_2$, from 3.58 to 4.18% $SO_4$ and from 400 to 550 ppm boron plus trace amounts of other alkali and alkaline earth metals is first treated with an extractant to remove the boron from the brine using any one of the methods described above for effecting reduction in the amount of boron in the brine to as low as 100 ppm and preferably less than 50 ppm boron. Following separation of the extractant from the brine the latter, which is now partially deboronated is then desulfated, decarnalited, and concentrated in successive stages as described in U.S. Pat. No. 3,516,785 and included herein by reference. The partially deboronated brine concentrate which now analysis from 35 to 45% $MgCl_2$ plus water is then reacted with a gelling agent such as for example magnesium hydroxide or hydrous magnesium carbonate, as hereinabove described, as a consequence of which the brine is gelled. The gelled brine is then spray dried using hot hydrochloric acid gas as the drying medium. The spray dried gel recovered from the spray drier comprises discrete particles of anhydrous magnesium chloride with only trace amounts of MgO, the bulk density of the anhydrous magnesium chloride being in the range from 20 to 48 pounds per cubic foot. As such the particles of magnesium chloride are readily transported to storage bins by conventional means such as conveyor belts, high pressure air ducts or the like; and from storage bins directly to the electrolytic cells in which the magnesium chloride is melted and to which a fluoride salt such as for example, calcium fluoride is added to dissipate any trace amounts of boron, MgO, MgOHCl, or $H_2O$ in the melt. In as much as the level of boron in the electrolyte is well below that at which the boron would have an adverse effect on the coalescence of the molten magnesium cell current efficiencies are high and accompanied by high recoveries of magnesium metal at relatively low consumption of chlorine. Moreover, the absence of $H_2O$ and MgO in the melt insures against loss of magnesium in the cell smut.

While the invention has been described and illustrated by the examples included herein it is not intended that the invention be strictly limited thereto and other variations and modifications may be employed within the scope of the appended claims.

We claim:

1. In a process for producing magnesium metal by electrolysis of a magnesium chloride electrolyte prepared from naturally occurring brines wherein a naturally occurring brine is treated in a succession of evaporation and concentration steps to form a magnesium chloride concentrate which is dehydrated by spray drying and chlorinated to remove occluded magnesium oxide the improvement comprising: treating a brine consisting essentially of from 7.0 to 7.5% Mg, water and trace amounts of metal impurities including from 400 to 550 ppm boron with an extractant to remove a major portion of the boron from the brine, desulfating and concentrating the partially deboronated brine, incorporating a gelling agent in said partially deboronated brine and homogenizing the brine-gellant mix to convert the brine to a magnesium chloride containing gel, chlorinating said gel by spray drying said gel in the presence of gaseous HCl to form a dried product comprising discrete particles of partially deboronated magnesium chloride substantially free of MgO, MgOHCl, and $H_2O$ and having a bulk density in the range of from 20 to 48 pounds per cubic foot, thereafter introducing said dried product without melting and chlorinating the same into an electrolytic cell and melting said dried product directly in said cell in the presence of fluoride ions to form a magnesium chloride electrolyte.

2. In a process for producing magnesium metal by electrolysis of a magnesium chloride electrolyte according to the improvement of claim 1 wherein said extractant is activated alumina added in an amount from 0.5 to 20.0 percent as $Al_2O_3$ on a brine weight basis.

3. In a process for producing magnesium metal by electrolysis of a magnesium chloride electrolyte according to the improvement of claim 2 wherein said extractant is a compound of aluminum oxide and magnesium oxide having the formula $Al_2O_3 \cdot MgO$.

4. In a process for producing magnesium metal by electrolysis of a magnesium chloride electrolyte according to the improvement of claim 1 wherein said extractant is finely divided lignite added in an amount in the range from 1.0 to 30.0 percent on a brine weight basis.

5. In a process for producing magnesium metal by electrolysis of a magnesium chloride electrolyte according to the improvement of claim 4 wherein said lignite is partially neutralized.

6. In a process for producing magnesium metal by electrolysis of a magnesium chloride electrolyte according to the improvement of claim 1 wherein said extractant is calcium oxide added in an amount from 5.0 to 25.0 percent on a brine weight basis.

7. In a process for producing magnesium metal by electrolysis of a magnesium chloride electrolyte according to the improvement of claim 6 wherein said calcium oxide is calcined oolitic sand.

8. In a process for producing magnesium metal by electrolysis of a magnesium chloride according to the improvement of claim 1 wherein said extractant is hydrogen fluoride.

9. In a process for producing magnesium metal by electrolysis of a magnesium chloride electrolyte according to the improvement of claim 1 wherein said gelling agent is selected from the group consisting of a hydrous metal oxide, and a hydrous metal carbonate.

10. In a process for producing magnesium metal by electrolysis of a magnesium chloride electrolyte according to the improvement of claim 9 wherein said gelling agent is magnesium hydroxide.

11. In a process for producing magnesium metal by electrolysis of a magnesium chloride electrolyte according to the improvement of claim 10 wherein said magnesium hydroxide gelling agent is formed in situ by adding MgO to an aliquot of said $MgCl_2$ brine, said MgO added in an amount from 0.1 to 10% on brine weight basis.

12. In a process for producing magnesium metal by electrolysis of a magnesium chloride electrolyte according to the improvement of claim 9 wherein said gelling agent is hydrous magnesium carbonate.

13. In a process for producing magnesium metal by electrolysis of a magnesium chloride electrolyte according to the improvement of claim 10 wherein said $Mg(OH)_2$ gelling agent is formed exteriorly of said brine by preparing an aqueous slurry of magnesium oxide.

14. In a process for producing magnesium metal by electrolysis of a magnesium chloride electrolyte according to the improvement of claim 1 wherein said gelling agent is incorporated in said brine prior to spray drying.

15. In a process for producing magnesium metal by electrolysis of a magnesium chloride electrolyte according to the improvement of claim 9 wherein said extractant is selected from the group consisting of activated alumina, lignite, CaO and the fluoride ion.

16. In a process for producing magnesium metal by electrolysis of a magnesium chloride electrolyte according to the improvement of claim 15 wherein activated alumina is added to said brine in an amount in the range from 0.5 to 20.0 percent as $Al_2O_3$ on brine weight basis.

17. In a process for producing magnesium metal by electrolysis of a magnesium chloride electrolyte according to the improvement of claim 15 wherein calcined oolitic sand is added to said brine in an amount in the range from 5 to 25 percent as CaO on brine weight basis.

18. In a process for producing magnesium metal by electrolysis of a magnesium chloride electrolyte according to the improvement of claim 15 wherein neutralized lignite is added to said brine in an amount in the range from 1 to 30 percent on brine weight basis.

19. In a process for producing magnesium metal by electrolysis of a magnesium chloride electrolyte according to the improvement of claim 1 wherein an alkaline earth metal fluoride is added to the molten $MgCl_2$ in said electrolytic cell to provide the fluoride ion in said electrolyte.

20. In a process for producing magnesium metal by electrolysis of a magnesium chloride electrolyte according to the improvement of claim 19 wherein said alkaline earth metal fluoride is calcium fluoride.

* * * * *